May 13, 1969  L. D. DI NAPOLI ET AL  3,444,449
PROTECTION CIRCUIT FOR SOLID STATE SWITCHING NETWORK
Filed Feb. 13, 1967
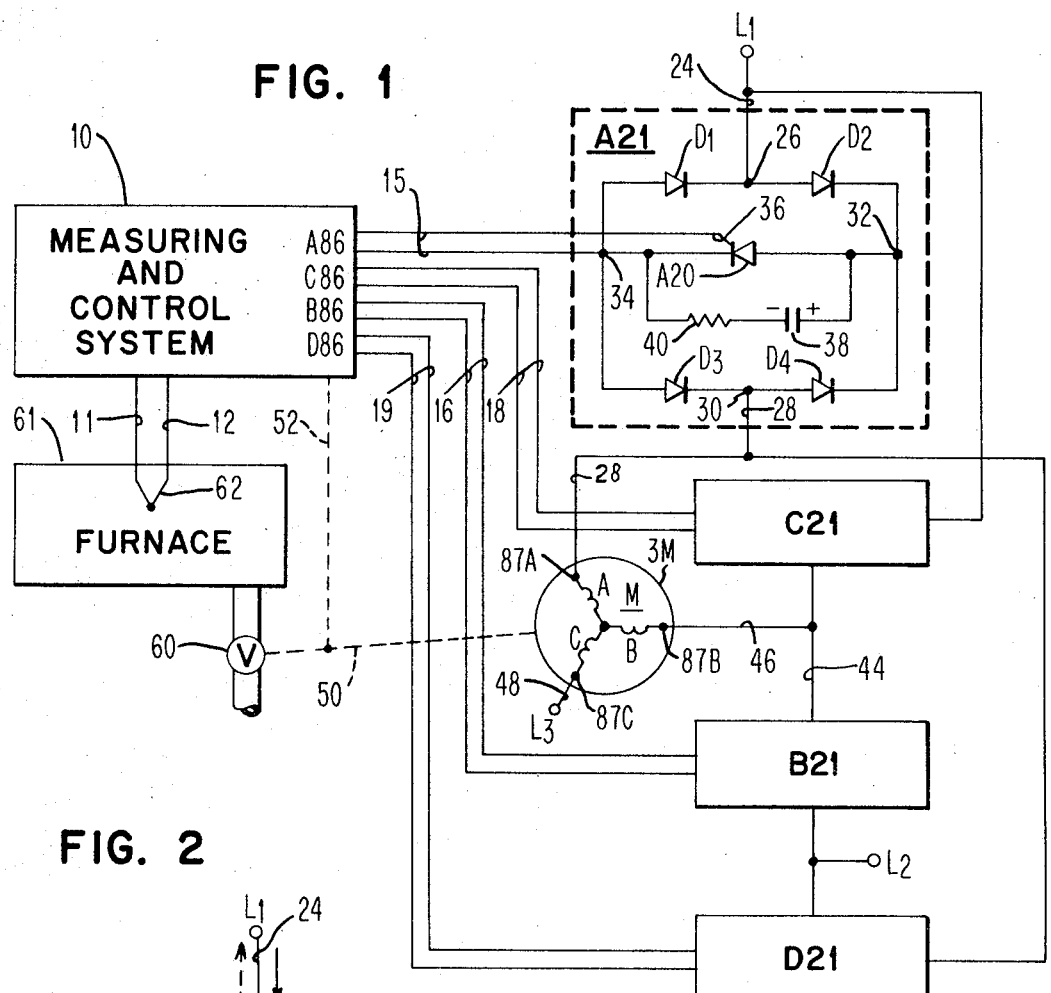
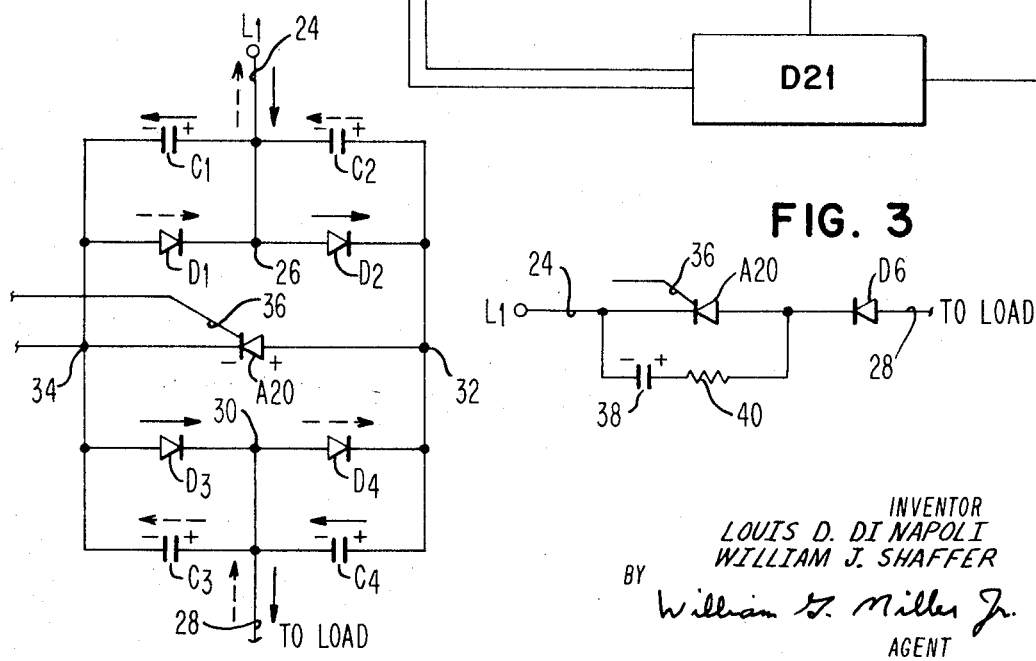
INVENTOR
LOUIS D. DI NAPOLI
WILLIAM J. SHAFFER
BY William G. Miller Jr.
AGENT

United States Patent Office 3,444,449
Patented May 13, 1969

3,444,449
PROTECTION CIRCUIT FOR SOLID STATE
SWITCHING NETWORK
Louis D. Di Napoli, Philadelphia, and William J. Shaffer,
North Wales, Pa., assignors to Leeds & Northrup Company, Philadelphia, Pa., a corporation of Pennsylvania
Filed Feb. 13, 1967, Ser. No. 615,526
Int. Cl. H02p 1/40
U.S. Cl. 318—207                                    9 Claims

ABSTRACT OF THE DISCLOSURE

An improved switching network for selecting the direction of rotation of a three-phase motor by turning on silicon controlled rectifier (SCR) switching elements which will provide the required phase orientation of the motor supply connections. The SCR's are connected in full wave rectifying bridge circuits so that current through the SCR's is unidirectional. The SCR's are each shunted by a series capacitor and resistor. The capacitors become charged to prevent a high rate of change of potential across an unselected SCR when a selected SCR connected to the same terminal as the unselected SCR is turned on.

Background of the invention

This invention relates to phase switching networks of the type utilizing unidirectional solid state switching elements and more particularly to a circuit for protecting an unselected unidirectional solid state switching element of such a network from excessive rates of change of potential across its terminals when another switching element selectively connects to the same load terminal a phase of the AC supply different from the phase which can be connected by the unselected switching element.

Unidirectional solid state switching elements and particularly SCR's have, in the past, been used for the selective switching of the connections to AC motors of two phases of a three-phase alternating current supply for determining the direction of rotation of those motors. Such switching networks have included SCR's in full-wave diode bridges as fully disclosed in U.S. Patent 3,302,085 entitled, "Load Control Systems Using Magnetic Amplifiers and Controlled Rectifiers," issued to Leonard R. Hulls and Rolland H. Henderson on Jan. 31, 1967. As will be explained more fully in a subsequent part of the description of the present invention, switching networks of the type described in the above referred to patent subject the SCR's utilized as the switching elements to excessive rates of change of voltage between the cathode and anode whenever another switching element is turned on at a particular point in the AC cycle to connect another phase of the signal to the same load terminal. These excessive rates of voltage change can produce a turning on of an SCR switching element which has not been selected. Such a turning on causes a shorting between two phases of the AC supply with the consequent damage to equipment and system operation.

Summary of the invention

In accordance with the present invention there is provided a switching network for selectively connecting a first source of an alternating current supply, which will be of one phase, or a second source of the alternating current supply, which will be of another phase, to one terminal of a load. There is provided a separate switching device for selectively connecting each of the sources and one of these switching devices includes a unidirectional solid state switching element and at least one rectifying element in series circuit with the switching element to allow conduction of current from one of the sources to the said one terminal of the load only in the forward direction of the switching element. A capacitor is connected in parallel with the switching element and in series with the rectifying element for the purpose of preventing an undesired turning on of the switching element of the unselected switching device in response to a rapid potential change across it when the other switching device is turned on.

The present invention, therefore, has for an object the provision of an improved solid state switching network for selectively driving a motor in one direction or another.

A still further object of the invention is to provide an SCR switching network which will not have the unselected switching rectifiers turned on to connect one phase of an AC supply to a particular terminal of the load at the same time that another phase of the AC supply has been selectively connected by another switching device to that same terminal.

Brief description of the drawings

The present invention will be better understood by reference to the description of the preferred embodiments in connection with the drawings in which like reference characters identify like elements of the figures.

FIG. 1 is a circuit diagram partially in block form showing the invention in a switching network for controlling a valve drive motor in a control system.

FIG. 2 is a circuit diagram of another form of the novel circuit.

FIG. 3 is a circuit diagram of still another form of the novel circuit arrangement.

Description of the preferred embodiments

In FIG. 1 the invention is shown as being utilized in the switching network of a control system which is of the type fully disclosed in U.S. Patent 3,302,085 with the reference numerals of FIG. 3 in the patent being utilized for corresponding elements in FIG. 1 of the present disclosure.

The control system of FIG. 1 may be used for the control of the temperature of a furnace 61 whose temperature is detected by thermocouple 62 and fed to a measuring and control system 10 by leads 11 and 12. The measuring and control system 10 may be a circuit arrangement of the type shown in FIG. 3 of the above referenced Patent 3,302,085, which is effective to provide simultaneously across lines 15 and 16 unidirectional gating signals such as are derived in FIG. 3 of the patent from the secondary windings A86 and B86. Alternatively, the measuring and control system 10 may provide across the lines 18 and 19 gating signals such as might be derived from the secondary windings C86 and D86, respectively, of FIG. 3 of the above referenced patent.

The measuring and control system 10 is effective through the switching network which includes the separate switching devices A21, B21, C21 and D21 to selectively determine the phase orientation of the connection of the three-phase AC supply derived from the terminals $L_1$, $L_2$ and $L_3$ to the control motor 3M at the terminals 87A, 87B and 87C. The connections are made so as to effect the desired direction of rotation of the motor 3M and set the control valve 60 to modify the fuel input to the furnace 61 to bring the temperature of the furnace to a desired value as established in the measuring and control system 10.

The gating signals provided at lines 15 and 16 or lines 18 and 19, as selectively produced by the measuring and control system 10, appear at the beginning of each half cycle of the AC supply so that both the positive and negative cycles of the AC supply are utilized to supply power to the control motor 3M.

If, for example, the measuring and control system 10 in response to the detected temperature as measured by thermocouple 62 produces on lines 15 and 16 gating pulses at the beginning of each half cycle, the unidirectional solid state switching elements of the switching devices A21 and B21 will be gated or turned on so as to be in a current conducting state during both half cycles of the supply connected to terminals $L_1$ and $L_2$ to thereby provide a particular phase orientation of current to terminals 87A and 87B so that the control motor 3M is rotated in the proper direction.

Since the switching devices A21, B21, C21 and D21 may all be similarly constructed, it will suffice to describe the operation of one of those devices. Considering the device A21, it will be evident from the connections of the diodes D1, D2, D3 and D4 that they form a full wave rectifying bridge circuit having the terminal $L_1$ connecting one phase of the supply by way of line 24 to the junction 26 and the motor power lead 28 connecting the junction 30 to the terminal 87A of the motor 3M. The junctions 26 and 30 form a pair of opposite points of the diode rectifying bridge.

An SCR A20 is connected between the junctions 32 and 34 which form another pair of opposite points of the diode rectifying bridge circuit. The SCR A20 is poled to conduct a unidirectional current from the junctions 32 toward junction 34. The gate electrode 36 is connected to one of the lines 15 while the other line 15 is connected to junction 34 so that a signal appearing across the lines 15 will serve to gate SCR A20 to a conductive state. The switching device A21, as so far described, is fully comparable to the similar numbered switching device shown in FIG. 3 of the above referenced patent. As shown in FIG. 1 of the present disclosure, however, there is added a protection circuit for SCR A20 comprising a capacitor 38 connected in series with a resistor 40 with the series combination of the capacitor 38 and the resistor 40 connected in parallel with SCR A20. With the diodes connected as shown in the switching device A21, the capacitor 38 will normally be charged in the polarity shown as a result of current flow through the diode bridge rectifying circuit when A20 is not turned on. The capacitor 38, however, will be discharged whenever SCR A20 is made conductive by being turned on in response to a gating signal appearing at the gating electrode 36. The discharge of capacitor 38 will be limited by resistor 40 so that an excessive discharge current will not be passed through the SCR A20. When A20 becomes nonconductive, the capacitor 38 will again be charged to the polarity shown and the magnitude of the charge will approach the peak magnitude of the potential appearing between lines 24 and 28 and hence across switching device A21.

It will be evident that the appearance of gating signals on lines 15 and 16 will cause the switching devices A21 and B21 to receive gating pulses which will turn on their switching elements so that current of the phase connected to terminal $L_1$ will be connected by line 28 to terminal 87A and hence to winding A of the motor 3M. Similarly, the gating signal appearing on line 16 will cause the switching device B21 to connect another phase of the three-phase supply appearing at terminal $L_2$ to be connected by way of lines 44 and 46 to terminal 87B and hence to winding B of the motor 3M.

As shown in FIG. 1, the winding C of the motor 3M is permanently connected to the phase presented at terminal $L_3$ which is connected by way of line 48 to terminal 87C. Such a phase orientation of the AC supply in the connections to the motor 3M will cause a rotation of the motor in one direction. For reversal of the direction of the motor it is only necessary to reverse the phase orientation of the supply to the windings A and B. This may be accomplished in the circuit shown in FIG. 1 by connecting the supply from the terminal $L_1$ to terminal 87B and simultaneously connecting the supply from terminal $L_2$ to terminal 87A. Such a phase orientation will result when gating signals from the measuring and control system 10 appear on lines 18 and 19.

As shown in FIG. 1, the motor 3M is connected by way of a mechanical coupling 50 to valve 60, and there is also a mechanical coupling 52 which provides a feedback to the measuring and control system 10 from the mechanical coupling 50. While the circuit of FIG. 1 as presently described is similar to that of the above referenced patent with the exception of the inclusion of the shunting capacitor and resistor such as capacitor 38 and resistor 40 around the SCR, there has been omitted for simplicity the circuits A88, B88, C88 and D88 of FIG. 3 in the referenced patent as well as the circuit connections to transformer 102 and the cams 111A and 111B of FIG. 3 of the above referenced patent. These omissions have been made since they are not necessary to the description and understanding of the present invention.

To illustrate the benefits to be derived from the present invention let it be assumed that all of the switching devices A21–D21 are turned off and the motor 3M is, therefore, in a stationary condition. If then the measuring and control system 10 provides gating signals on lines 18 and 19 so as to make the switching devices C21 and D21 both conductive, it will be evident, if we consider the switching devices A21 and D21 alone, that the turning on of the switching device D21 connects one phase of the AC supply to line 28. If the turning on of the switching device D21 occurs at a point in the cyclic variations of the potentials of the several phases of the AC supply such that there is a difference between the potential at terminal $L_2$ and terminal $L_3$ as compared with the potential at terminal $L_1$ with respect to $L_3$, which upon the turning on of D21 produces a change in potential at line 28 causing a rapid change in the potential across device A21 close to the peak potential which normally appears across device A21, there will then appear across the switching device A21 and hence across the SCR A20, between its anode and cathode, a potential change approaching the peak potential. This potential change may occur in 2 or 3 microseconds so as to cause the rate of change of voltage across the SCR A20 to exceed that tolerable limit for which the SCR A20 is designed. When such a rapid change in the potential across the SCR does occur, the voltage change will, by way of the capacitance between the junctions internal to the SCR, reach the gate electrode and cause the SCR A20 to be turned on. It will be evident that a turning on of the SCR A20 serves to connect the supply at terminal $L_1$ to line 28 at the same time that the supply at terminal $L_2$ is connected to line 28. This causes a short circuit between the two phases of the three-phase supply.

The above described phenomenon can occur only when there is not included in the unselected switching devices A21, the capacitor 38 and the resistor 40, and only when the switching on of the source connected to terminal $L_2$ by device D21 occurs at a time which produces an intolerable voltage change across device A21. Since it is relatively impossible and certainly uneconomical to adapt the circuit to constrain the switching or turning on of the switching device to periods during the cycle of the AC supply when such dangerous voltage changes do not occur, it is advantageous to protect the switching device from the rapid voltage changes to prevent the inadvertent turning on of the switching devices such as A21 when the switching device D21, connected to the same terminal of the load, is turned on. To provide this protection the novel circuit addition of capacitor 38 and resistor 40 has been made in switching device A21. A similar arrangement may be advantageously included in the switching devices B21, C21 and D21. It will be evident that with the capacitor 38 connected in shunt with the SCR A20 and with the charge on capacitor 38 having a polarity as shown in FIG. 1, then the turning on of the switching device D21 to connect the terminal $L_2$ to line 28 may raise the potential of line 28 but will not under any circumstances raise the potential of the line to a point such that it will exceed the potential stored on the capacitor 38 which is oppositely poled to the potential which will appear on line 28. Therefore, the capacitor charge is effective to back bias the diode D4 and prevent the appearance of a rapid increase in potential across the SCR A20.

The circuit of FIG. 2 shows an alternate arrangement for device A21 of FIG. 1 which may be utilized for protecting the SCR A20 as it is protected by the capacitor 38 and resistor 40 in FIG. 1. In FIG. 2 the rectifiers D1–D4 are connected in a full wave rectifying bridge circuit similar to that of FIG. 1. The supply line from terminal $L_1$ is connected by way of line 24 to junction 26, and one terminal of the load is connected by the power supply line 28 to junction 30. The junctions 26 and 30, therefore, form opposite points of the bridge rectifier. As shown in FIG. 2, the SCR A20 is connected between the other pair of opposite points formed by junctions 32 and 34 with the rectifier being turned on when an appropriate signal is applied to the gating electrode 36.

In FIG. 2 each of the diodes D1–D4 has a capacitor connected in parallel with it. These capacitors are preferably of equal capacity so that there is formed a balanced capacitor bridge. These capacitors, identified as C1–C4, are respectively connected in parallel with diodes D1–D4.

When the potential at terminal $L_1$ is positive with respect to the potential on line 28, current will flow in the direction shown by the solid arrows so as to charge up the capacitor C1 and the capacitor C4 with the polarity shown. When the supply at terminal $L_1$ goes negative with respect to line 28, current will flow in the direction shown by the dashed arrows and the capacitors C1 and C4 will be discharged while capacitors C2 and C3 will be charged with the polarity shown. With the capacitors and diodes connected as shown, a rapid change in potential at line 28, which might have caused in the prior art circuits a high rate of potential change to appear across A20, will not cause such a result in the circuit of FIG. 2.

In FIG. 3 there is shown a still further variation of the type of circuit which may be utilized for switching device A21 of FIG. 1 if it is desired to utilize only half wave operation of the motor 3M. In FIG. 3 the SCR A20 as connected in series with a diode D6 which is poled to allow current in a forward direction to the SCR A20. There is connected in parallel with the A20 a series circuit made up of capacitor 38 and resistor 40 which act as a protection circuit for the SCR A20 with the capacitor having a stored charge of the polarity shown to prevent any rapid change of potential across the SCR A20 as a result of a rapid change of potential between line 24 and line 28 due to the connection of one phase of the supply to one terminal of the load other than the phase which can be connected by the device A21 as previously described in connection with FIG. 1. Effectively, the charge on capacitor 38 serves to back bias the diode D6 so as to prevent any rapid changes in potential across the switching device which would tend to turn on the switching element from doing so.

What is claimed is:

1. A switching network for selectively connecting a first terminal for supplying a source of alternating current of one phase or a second terminal for supplying a source of alternating current of another phase to one terminal of a load comprising:
    (1) a first switching device for selectively connecting said first terminal to said one terminal of the load; and
    (2) a second switching device for selectively connecting said second terminal to said one terminal of the load, said second switching device including:
        (a) a unidirectional solid state switching element,
        (b) a rectifying element connected in series with said switching element and poled to allow current to pass between said second terminal and said one terminal of the load in a forward direction for said switching element, and
        (c) a capacitor connecting a circuit point intermediate between said rectifying element and said switching element and a circuit point on that side of said switching element opposite the side connected to said rectifying element, said connection being such that said capacitor will discharge only when said switching element is in a conductive state.

2. A switching network as set forth in claim 1 in which said solid state switching element is a silicon controlled rectifier.

3. A switching network as set forth in claim 2 in which said rectifying element is a solid state diode.

4. A switching network for selectively connecting a first terminal for supplying a source of alternating current of one phase or a second terminal for supplying a source of alternating current of another phase to one terminal of a load comprising:
    (1) a first switching device for selectively connecting said first terminal to said one terminal of the load; and
    (2) a second switching device for selectively connecting said second terminal to said one terminal of the load, said second switching device including:
        (a) a unidirectional solid state switching element,
        (b) a rectifying element connected in series with said switching element and poled to allow current to pass between said second terminal and one temrinal of the load in a forward direction for said switching element,
        (c) a resistor,
        (d) a capacitor, and
        (e) means connecting said resistor and capacitor in series between a circuit point intermediate between said rectifying element and said switching element and a circuit point on the side of said switching element opposite that connected to said rectifying element, said connection being such that said capacitor will discharge only when said switching element is in a conductive state.

5. In combination with a switching network for selectively connecting a first or second phase of the three phases of an alternating current source to two terminals of a three-phase motor in one or another phase orientation with respect to the connection of the third phase to cause the motor to rotate in a forward or reverse direction respectively, wherein a separate switching device is provided for connecting the first and second phases selectively to each of the two terminals and the separate switching devices each includes a full-wave bridge rectifier having one phase of the alternating current source and a terminal of the motor connected respectively to separate junctions forming one pair of opposite points of the bridge and a unidirectional solid state switching element connected to other junctions which form another pair of opposite points of the bridge so that said switching element is subjected to a potential of polarity for producing forward current flow through said switching element to said motor during both half cycles of said source, the improvement which comprises:
    a capacitor connected in a parallel circuit with the switching element of each of the switching devices so that the only discharge path for said capacitor is through said switching element, said capacitor being operative to prevent a turning on an unselected one of said switching devices in response to a high rate of potential change across the unselected switching device when a selected one of the switching devices is turned on to connect a particular phase of said source to that one of said two terminals of the motor to which said unselected device is connected.

6. The combination of claim 4 in which the unidirectional solid state switching device is a silicon controlled rectifier and in which said bridge rectifier comprises bridge connected solid state rectifying elements.

7. In combination with a switching network for selectively connecting a first or second phase of the three phases of an alternating current source to two terminals of a three-phase motor in one or another phase orientation with respect to the connection of the third phase to cause the motor to rotate in a forward or reverse direction respectively, wherein a separate switching device is provided for connecting the first and second phases selectively to each of the two terminals and the separate switching devices each includes a full-wave bridge rectifier having one phase of the alternating current source and a terminal of the motor connected respectively to separate junctions forming one pair of opposite points of the bridge and a unidirectional solid state switching element connected to other junctions which form another pair of opposite points of the bridge so that said switching element is subjected to a potential of polarity for producing forward current flow through said switching element to said motor during both half cycles of said source, the improvement which comprises:

(1) a capacitor for each switching device,
(2) a resistor for each switching device, and
(3) means for connecting the resistor and capacitor of each switching device in series and for connecting the series combination of said resistor and capacitor in a parallel circuit with the switching element of the switching device, said connection being such that the capacitor will discharge only through said switching element so that said parallel circuit prevents a turning on of an unselected one of said switching devices when a selected one of the switching devices is turned on to connect a particular phase of said source to that one of said two terminals of the motor to which said unselected switching device is connected.

8. In combination with a switching network for selectively connecting a first or second phase of the three phases of an alternating current source to two terminals of a three-phase motor in one or another phase orientation with respect to the connection of the third phase to cause the motor to rotate in a forward or reverse direction respectively, wherein a separate switching device is provided for connecting the first and second phases selectively to each of the two terminals and the separate switching devices each includes a full-wave bridge rectifier having one phase of the alternating current source and a terminal of the motor connected respectively to separate junctions forming one pair of opposite points of the bridge and a unidirectional solid state switching element connected to other junctions which form another pair of opposite points of the bridge so that said switching element is subjected to a potential of polarity for producing forward current flow through said switching element to said motor during both half cycles of said source, the improvement which comprises:

a separate capacitor connected in a parallel circuit with each of the rectifiers of the full-wave bridge so that the only discharge path for said capacitor is through said switching element, said capacitor being operative to prevent a turning on of an unselected one of said switching devices upon the turning on of a selected one of said switching devices operable to connect a particular phase of said source to the same terminal of said motor as said unselected switching device.

9. A switching network for selectively connecting a first terminal for supplying a source of alternating current of one phase or a second terminal for supplying a source of alternating current of another phase to one terminal of a load comprising:

(1) a first switching device for selectively connecting said first terminal to said one terminal of the load;
(2) a second switching device for selectively connecting said second terminal to said one terminal of the load, and said second switching device including:
(a) a unidirectional solid state switching element,
(b) a rectifying element connected in series with said switching element and poled to allow current to pass between said second terminal and said one terminal of the load in a forward direction for said switching element, and
(c) a capacitor connecting a circuit point intermediate between said rectifying element and said switching element and a circuit point on that side of switching element opposite the side connected to said rectifying element so that said capacitor will maintain across said switching element a constant potential substantially equal to the peak applied line voltage of said source so long as said second switching device is nonconductive.

References Cited

UNITED STATES PATENTS 3,253,202  5/1966  Cotton _____ 318—227
3,309,593  3/1967  Egglestone et al. __ 318—227 XR ORIS L. RADER, *Primary Examiner.*

G. Z. RUBINSON, *Assistant Examiner.*

U.S. Cl. X.R.

318—227